United States Patent
Herold et al.

(10) Patent No.: US 9,507,412 B2
(45) Date of Patent: Nov. 29, 2016

(54) BIDIRECTIONAL DISPLAY AND TRIGGERING THEREOF

(75) Inventors: Rigo Herold, Dresden (DE); Bernd Richter, Dresden (DE); Uwe Vogel, Dresden (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 387 days.

(21) Appl. No.: 14/122,970

(22) PCT Filed: May 31, 2011

(86) PCT No.: PCT/DE2011/001181
§ 371 (c)(1),
(2), (4) Date: Feb. 11, 2014

(87) PCT Pub. No.: WO2012/163312
PCT Pub. Date: Dec. 6, 2012

(65) Prior Publication Data
US 2014/0145939 A1    May 29, 2014

(51) Int. Cl.
  *G06F 3/00* (2006.01)
  *G02B 27/01* (2006.01)
  (Continued)

(52) U.S. Cl.
  CPC ........... *G06F 3/005* (2013.01); *G02B 27/0093* (2013.01); *G02B 27/017* (2013.01); *G02B 2027/014* (2013.01); *G02B 2027/0138* (2013.01); *G02B 2027/0187* (2013.01);
  (Continued)

(58) Field of Classification Search
  CPC ............. H04N 7/144; H04N 13/0484; H04N 13/044; G02B 27/0093; G02B 2027/0138; G02B 27/017; G02B 2027/0187; G02B 2027/014; G06F 3/005; G09G 2354/00; G09G 3/3208
  See application file for complete search history.

(56) References Cited

U.S. PATENT DOCUMENTS 6,636,185 B1   10/2003   Spitzer et al.
8,274,034 B2    9/2012   Vogel et al.
(Continued)

FOREIGN PATENT DOCUMENTS

| DE | 102006030541 A1 | 12/2007 |
|---|---|---|
| JP | 0922778 A | 1/1997 |
| JP | 2006317682 A | 11/2006 |
| JP | 2009117904 A | 5/2009 |
| JP | 2010072188 A | 4/2010 |
| JP | 2010262232 A | 11/2010 |

OTHER PUBLICATIONS

"International Application No. PCT/DE2011/001181, International Search Report dated Mar. 16, 2012", 9 pgs.
(Continued)

*Primary Examiner* — Alexander Eisen
*Assistant Examiner* — Abhishek Sarma
(74) *Attorney, Agent, or Firm* — Schwegman Lundberg & Woessner, P.A.

(57) ABSTRACT

The present invention relates to a bidirectional display having a two-dimensional display array comprising a plurality of light-generating pixels and a two-dimensional camera array comprising a plurality of light-detecting elements, wherein the two arrays can each be electrically triggered line by line and are preferably interleaved in at least in some sections, featuring electrical triggering of the display array and of the camera array wherein, during light generation in a line of the display array, light detection with that line of the camera array which is closest to said line is deactivated, i.e. line-sequential electrical triggering of the bidirectional display.

17 Claims, 6 Drawing Sheets

Figure 1:
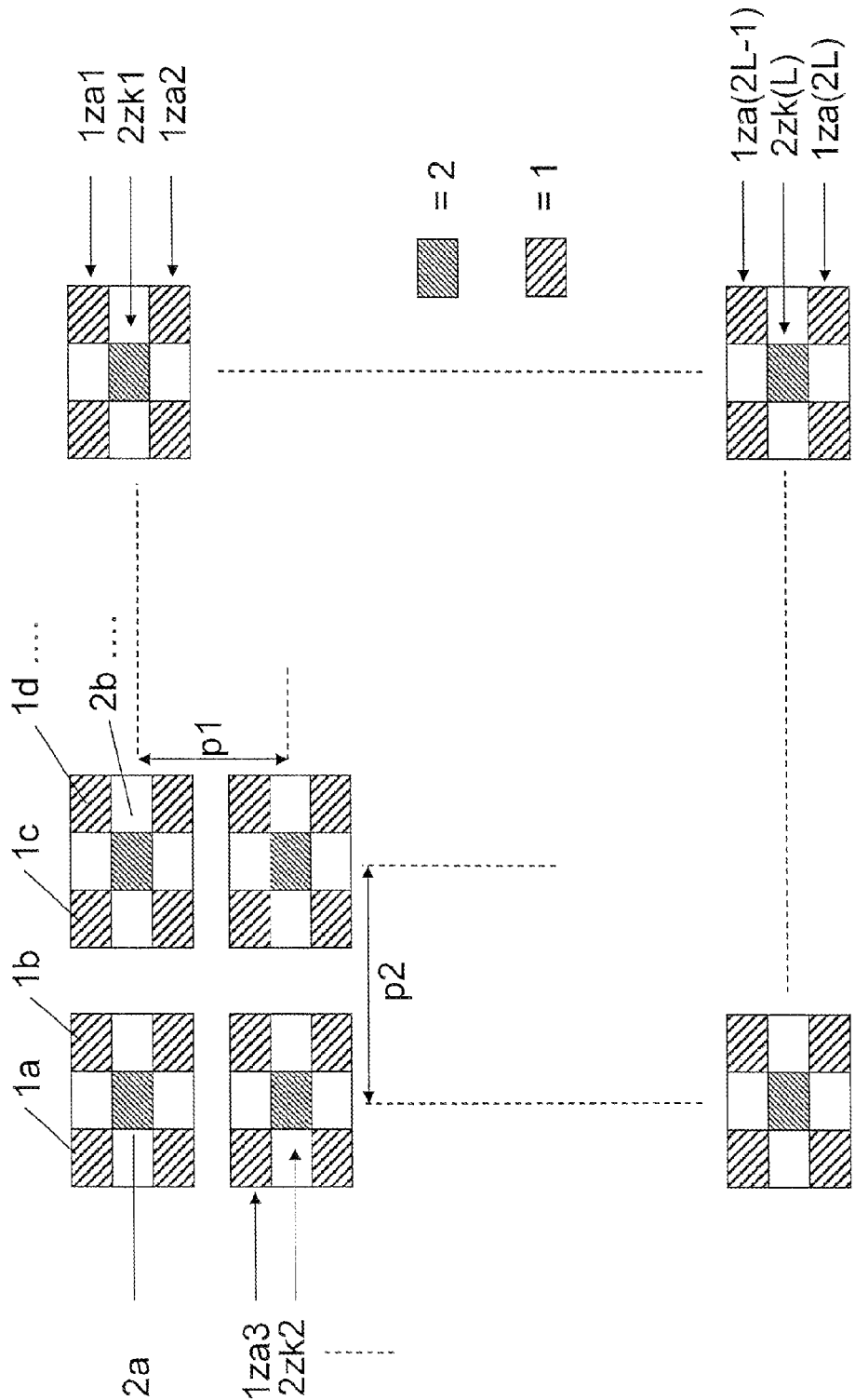

(51) Int. Cl.
*G02B 27/00* (2006.01)
*G09G 3/32* (2016.01)
*H04N 13/04* (2006.01)

(52) U.S. Cl.
CPC ........ *G09G3/3208* (2013.01); *G09G 2354/00* (2013.01); *H04N 13/044* (2013.01); *H04N 13/0484* (2013.01)

(56) References Cited

U.S. PATENT DOCUMENTS

| | | | |
|---|---|---|---|
| 2003/0117369 A1 | 6/2003 | Spitzer et al. | |
| 2006/0145365 A1 | 7/2006 | Halls et al. | |
| 2010/0012817 A1* | 1/2010 | Vogel | H01L 31/173 250/201.1 |

OTHER PUBLICATIONS

Hua, Hong, et al., "Video-based eyetracking methods and algorithms in head-mounted displays", Optics Express, vol. 14, No. 10, (May 8, 2006), 4328-4350.

Sernelius, Bo E., "Reflection from a Metallic Surface", Lecture, University of Linkoping, (2010), 11 pgs.

"International Application PCT/DE2011/001181, English Translation of International Preliminary Report on Patentability mailed Dec. 12, 2013", 16 pgs.

Japanese Application Serial No. 2014-513050, Office Action mailed Jan. 16, 2015, w/ English Translation, (Jan. 16, 2015), 10 pgs.

Taiwanese Application Serial No. 101119045, Office Action mailed Mar. 30, 2016, w/ English Translation, (Mar. 30, 2016), 15 pgs.

\* cited by examiner

BIDIRECTIONAL DISPLAY AND TRIGGERING THEREOF

PRIORITY CLAIM TO RELATED APPLICATIONS

This application is a national stage application under 35 U.S.C. §371 of PCT/DE2011/001181, filed May 31, 2011, and published as WO 2012/163312 A1 on Dec. 6, 2012, which application and publication are incorporated by reference as if reproduced herein and made a part hereof in their entirety, and the benefit of priority of which is claimed herein.

The present invention relates to a bidirectional display and to the electronic control thereof.

Such bidirectional displays can in particular be used for detecting the direction of gaze of the eyes in so-called "head-mounted displays" (HMDs), for example. In the following, embodiments for the bidirectional displays in accordance with the invention will therefore also above all be described with reference to such HMDs. The bidirectional displays in accordance with the invention can, however, also be used for other application purposes, for example for gaze-controlled view finders in digital cameras for menu control. A use in the field of microscopes for user control, e.g. for moving an xy-stage by gaze control, is also possible. Further areas of use are conceivable.

HMDs using an eye-tracking function are first known from the prior art which each have a separate component for virtual image projection and for detecting the direction of gaze of a user (J. P. Rolland, H. Hua, P. Krishnashwamy: "Video-based eye tracking methods and algorithms in head-mounted displays", optics express (2006), Vol. 14, H.10, p. 4328-4350). In this respect, the eye looks through a semi-transparent mirror onto the real world. A virtual display image is magnified by an eyepiece and presented to the eye via a semi-transparent mirror. The eye is illuminated by an infrared radiation source and the eye image is imaged onto a camera through a lens via a second semi-transparent mirror. Due to the spatially separate arrangement of the display and the camera, no optical or electrical crosstalk occurs in such HMDs. This system architecture can, however, only achieve a limited degree of miniaturization as well as a moderate power consumption due to the high number of components.

Furthermore, optical arrangements are known from the prior art (DE 10 2006 030 541 A1) in which at least one element emitting electromagnetic radiation is arranged together with a plurality of elements detecting electromagnetic radiation or at least one element detecting electromagnetic radiation is arranged together with a plurality of elements emitting electromagnetic radiation on a common substrate. The elements emitting radiation and the elements detecting radiation can in this respect be realized in CMOS technology (the elements emitting radiation can be organic light-emitting diodes, OLEDs; the elements detecting radiation can be CMOS photodiodes). The arrangements shown in DE 10 2006 030 541 A1 can (see the following) form the basis of the display array and of the camera array for the bidirectional display in accordance with the invention (which is then supplemented by an electrical control in accordance with the invention). DE 10 2006 030 541 A1 and the specific optical arrangements described therein are therefore constituent parts of the present invention as structures for display arrays and camera arrays.

Bidirectional displays, for example for "head-mounted displays" for detecting the direction of gaze of the eye in the form of bidirectional OLED microdisplays can thus be realized as particularly small on the basis of DE 10 2006 030 541 A1. In addition to an advantageous miniaturization with a high functionality, however, various problems result in this respect for projecting a light-intense virtual image to the user in operation, on the one hand, and for detecting the eye image for eye-tracking robustly, on the other hand. Due to the architecture of a bidirectional OLED microdisplay, optical crosstalk of the OLED pixels (very generally also called light-generating picture elements in the following) with the adjacent camera pixels (also called light-detecting elements in the following) occurs within the nested active matrix (mutual nesting of the display array and of the camera array, see in the following). This optical crosstalk has the consequence, however, that the dynamic range of the output signal of the light-detecting elements is very limited. Furthermore, there is not only optical crosstalk, but also electrical crosstalk due to the circuit parts adjacent in the circuit. This electrical crosstalk then has the consequence that there is interference of the signal of the light-detecting elements due e.g. to capacitive crosstalk on signal lines within the nested display arrays and camera arrays.

(A further problem which occurs with bidirectional displays in HMDs is the optical decoupling between the virtual image projection from the microdisplay to the retina and the imaging of the eye image onto the camera matrix of the bidirectional display. This decoupling is, however, achieved in that the eye image is detected in the near infrared range. On the system side, the eye of the user must therefore be illuminated in the near infrared range. The intensity of the infrared radiation reflected by the user eye is in this respect subject to different loss mechanisms in the system as well as to statutory restrictions in the maximum radiation strength. The quality of the eye image map detected in the bidirectional microdisplay deteriorates with a non-optimized dimensioning of the system components. The power consumption of the system furthermore increases. Poor image quality can even make the eye-tracking impossible.)

Starting from the prior art, it is therefore the object of the present invention to provide bidirectional displays which solve the problems addressed above in which therefore a sufficient optical and/or electrical decoupling is ensured with a high degree of miniaturization.

This object is achieved by a bidirectional display in accordance with claim 1 as well as by a method of controlling such a display in accordance with claim 16. Advantageous embodiment variants can be seen from the dependent claims. Uses in accordance with the invention can be seen from claim 17.

The present invention will first be described generally in the following and then with reference to various advantageous embodiment variants. The individual features of the present invention realized in combination with one another in the individual embodiments in this respect do not have to be realized exactly in the combination with one another shown in the embodiments, but the individual features can rather also be combined with one another in a different manner within the framework of the protective scope defined by the claims. Individual ones of the features shown in a specific embodiment can in particular also be omitted or also taken over in other ones of the embodiments shown.

The bidirectional displays in accordance with the invention are based on a nested and/or superimposed array structure of a display array and of a camera array, that is on an array structure which is both image reproducing and image receiving. Depending on the demands on the definition of the camera, on the one hand, and of the display, on the other hand, a light-detecting element, that is a camera pixel, can e.g. be surrounded by a plurality of light-generating picture elements, that is by a plurality of image pixels, or one image pixel can e.g. be surrounded by a plurality of camera pixels. An arrangement in which camera pixels and image pixels are arranged alternately in each display row (chessboard pattern of camera pixels and image pixels) is just as conceivable as other types of mutual nesting of the light-generating picture elements and of the light-detecting elements.

If not otherwise stated in the following, the spectral range of the maximum emission of the light-generating picture elements (e.g.: intensity maximum in the visible range) is spaced sufficiently far from the spectral range of the maximum sensitivity of the light-detecting elements (e.g. in the near infrared spectrum) so that a certain decoupling, albeit not a sufficient optical decoupling, is already realized by this measure.

A bidirectional display in accordance with the invention thus has a display array having a plurality of light-generating picture elements and a camera array having a plurality of light-detecting picture elements. The two arrays are preferably each electrically controllable row-wise and preferably also at least section-wise, particularly preferably arranged completely nested in one another (see the above explanations on the active matrix).

As a rule, both the display array and the camera array are two-dimensional arrays. It is, however, also conceivable that e.g. one of these arrays (e.g. the camera array) only has to be designed as one-dimensional, that is as one single row which is arranged nested in one row or between two rows of the other array.

In accordance with the invention, a sequential electrical control, from a time aspect, of the two arrays is realized. In this respect, in particular an electrical control of the display array and of the camera array can be realized such that, during a light generation in one row of the display array, a light detection with the row of the camera array disposed closest to this row (optionally also with further camera rows) is deactivated. A row-sequential electrical control of the bidirectional display can thus in particular take place: First a light generation in a selected row of the display array; only then, after the light generation has been ended in this row, an activation of the row of the camera array disposed closest to this row of the display array and an image taking with this row of the camera array.

The present invention naturally thus also includes a column-wise electrical control instead of a row-wise control: The division of the array(s) into rows and columns is purely a question of definition so that (on a rotation of the array(s) by e.g. 90°) columns can also be considered as rows so that a corresponding column-wise control of the array(s) is equally covered by the present invention.

In a further advantageous embodiment variant, the electrical control in accordance with the invention of the display array and of the camera array takes place such that, during the (simultaneous or also time-offset) light generation in a plurality of rows, preferably adjacent rows, of the display array, the light detection by the rows disposed closest (i.e. arranged adjacent) to this plurality of rows of the camera array is deactivated.

The logical continuation of this idea then results in a further advantageous embodiment variant of the electrical control in which any and all light detection with the camera array is deactivated during a light generation in any of the rows of the display array. In this case, a complete separation, from a time aspect, of the electrical control of the display array and of the electrical control of the camera array is present. If therefore light is generated anywhere in the display array, the entire camera array is switched so that light is nowhere detected in it.

On the other hand, however, an electrical control of the display array and of the camera array is also possible in which, during a light generation in one row of the display array (e.g. in the first, top row), a light detection is enabled with a row of the camera array which is not the row of the camera row next closest to this row of the display array, but rather has a sufficient distance from the row just generating light. That row with which the light detection is enabled can then in particular be that row of the camera array which is disposes furthest away from the row of the display which is then light-active. It is in this respect naturally also possible that a plurality of rows of the display array are still light generating (offset in time or also simultaneously), whereas a plurality of rows of the camera array arranged with a sufficient distance from the light generating rows of the display array are already carrying out a light detection (offset in time to one another or also simultaneously) or have started said light detection.

An electrical control is equally possible in which, during a light detection with one row, with a plurality of rows or with all rows of the camera array, a programming is enabled in a row or also in a plurality of rows of the display array of this/these last-named row(s) of the display array and/or a writing of the data to be represented in the last-named row(s) into said row(s) is enabled, with then only the programming and/or the writing being enabled in the last-named rows(s), but not the representation of the data associated with the transmission of light.

An electrical control is also possible in which a light generation and/or an electrical activity is not enabled in any of the rows of the display array during the illumination of the camera array by an external light source (in particular by a light source emitting in the near infrared) and/or during the light detection by at least one of the rows of the camera array.

In a further advantageous embodiment variant, a predefined time interval $\Delta t$ is present (for one or also for a plurality of rows of the display array) between the end of the programming of rows and/or the end of the writing of data into these rows to be represented in these rows, on the one hand, and the start of the light detection (by one or more rows of the camera array), on the other hand. The length of this time interval in this respect advantageously amounts to at least one tenth, preferably at least one fifth, preferably at least half of the time duration $\Delta t_{KE}$ of the light detection by the row(s) of the camera array.

In a further preferred variant, the time duration $t_{AE}$ of the light generation is of equal length for all rows of the display array. The time duration $t_{AD}$ of the deactivation of the light generation and/or of the electrical deactivation and/or of the switching off of the respective row can also be of equal length for all rows of the display array.

The light detection can take place in one and the same time interval $t_{KE}$ in all rows of the camera array, with the light generation then being able to take place offset in time with respect to one another in the individual rows of the display array and for all rows of the display array outside this time interval $t_{KE}$.

It is, however, equally possible that both the light detection in the individual rows of the camera array and the light generation in the individual rows of the display array take place mutually offset in time. The light detection then takes place outside the time interval of the light generation of the corresponding row of the display array for all rows of the display array in the row of the camera array arranged next closest (adjacent) in each case.

In accordance with the invention, the term light generation in a row can be defined as follows: A writing into this row of data to be represented in this row and/or a programming of this row together with the representation of data in this row together with the deletion of the data represented in this row can be meant by this light generation. In this case, the term light generation in a row (or also in the total display array) thus includes the total time span of the electrical activity of this row or of the whole display array.

It is, however, equally possible in accordance with the invention only to understand light generation as the above-described writing and/or programming together with the above-described representation of data (that is without the subsequent deletion of the represented data from the row). Only the representation together with the deletion can also be understood by this. Finally, the term light generation in the present invention can also be understood only as the above-described representation of data in a row (or in the total array).

The electrical control method in accordance with the invention in the display array and in the camera array then have to be adapted in accordance with these definitions or the corresponding time periods for the writing and/or programming, the representing of data and the deleting of data.

The light detection in a row of the camera array (or also in the total camera array, provided all the camera rows are being operated simultaneously) can equally mean a switch-on delay (or its time duration) up to the start of the row integration (that is the detection) of the light quanta emanating from an external light source and incident on the row, the integration and finally also the reading out of the row signal generated by the integration of the individual incident photons of the external light source. In accordance with this definition, the light detection (or its time duration) thus includes the total phase of the electrical activity of the row of the camera array (or of the total camera array).

It is, however, equally possible (with a corresponding adaptation of the time control or of the individual time durations in the electrical control of the display array and of the camera array) to define the light detection only as the phase including the above-described integration and the already described reading out. A definition as the time interval only including the above-described switch-on delay together with the above-described integration or as only the time interval of the integration is also possible.

In accordance with the invention, the light generation and the light detection can be carried out a plurality of times after one another (that is in cycles), preferably at periodic intervals corresponding to the individual display images or frames to be represented in the display (a light detection then also takes place in each cycle generating a light generation, with the relationship between the light generation in the individual rows of the display array and the light detection by the individual rows of the camera array being able to be realized as in the above-described embodiment variants).

The display array (or its individual light-generating picture elements) preferably emits light visible to the human eye; however, as little infrared light as possible, preferably none, beyond this. In contrast, the camera array (or its light-detecting elements) preferably detects infrared light (preferably in the near infrared range); however as little visible light as possible, preferably no visible light, beyond this.

The light-generating picture elements or pixels of the display array can be organic light-emitting diodes, OLEDs. The light-detecting elements or pixels of the camera array can be photodiodes or phototransistors. The light-generating picture elements and the light-detecting elements can in this respect be realized either as separate matrices or also as mutually nested matrices as well as matrices formed and/or integrated in CMOS technology.

The bidirectional display can be a microdisplay whose light-generating picture elements have a side length in the range between 4 and 40 μm. The side length of the light-detecting elements can lie in the range between 4 and 40 μm.

As already described, the integration of the light-generating picture elements and of the light-detecting elements or the nesting of the display array and of the camera array of the present invention can take place as described in DE 10 2006 030 541 A1.

The invention will be described in the following with reference to a plurality of embodiments.

There are shown

Figure 2:
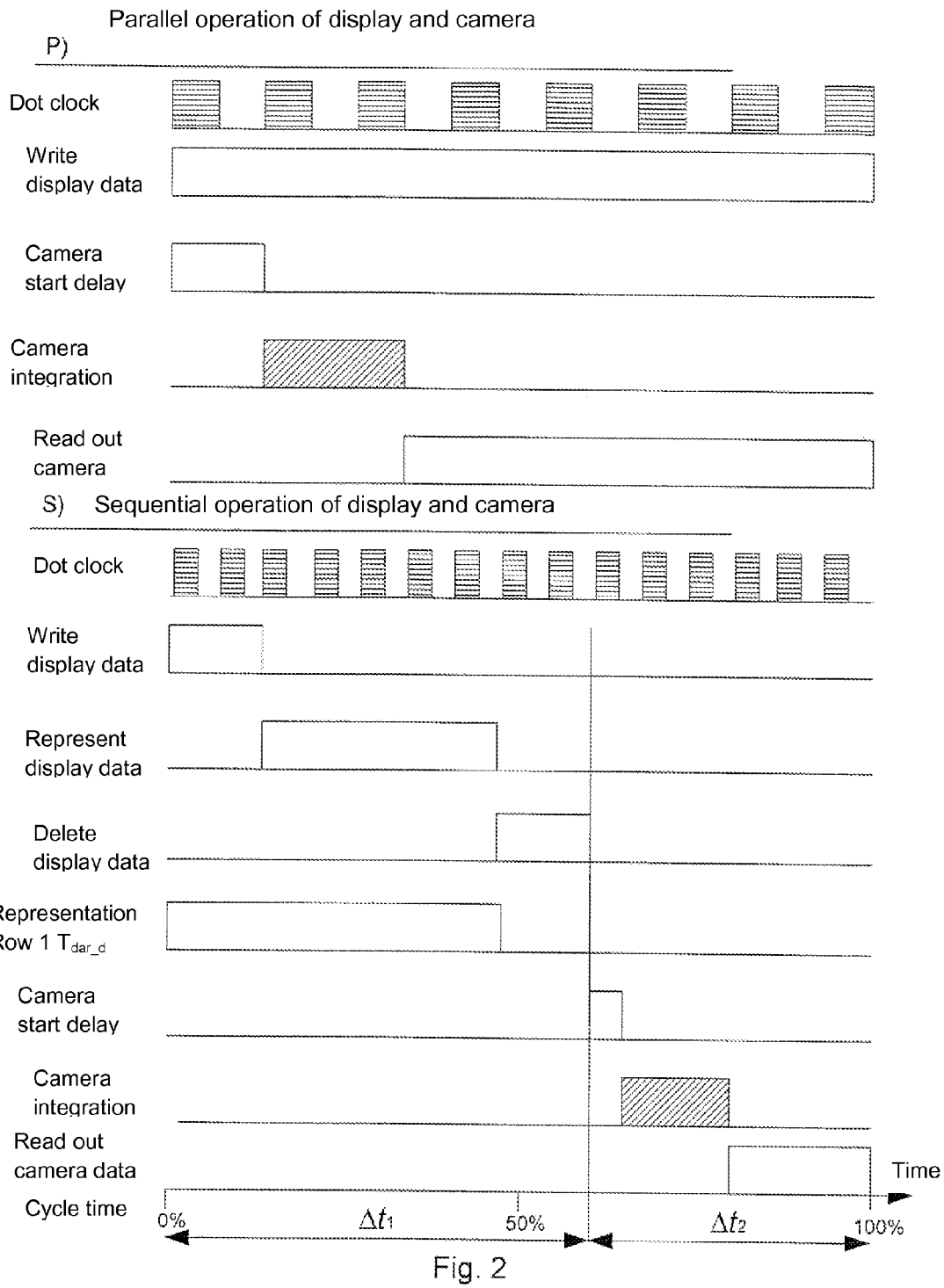
Figure 3:
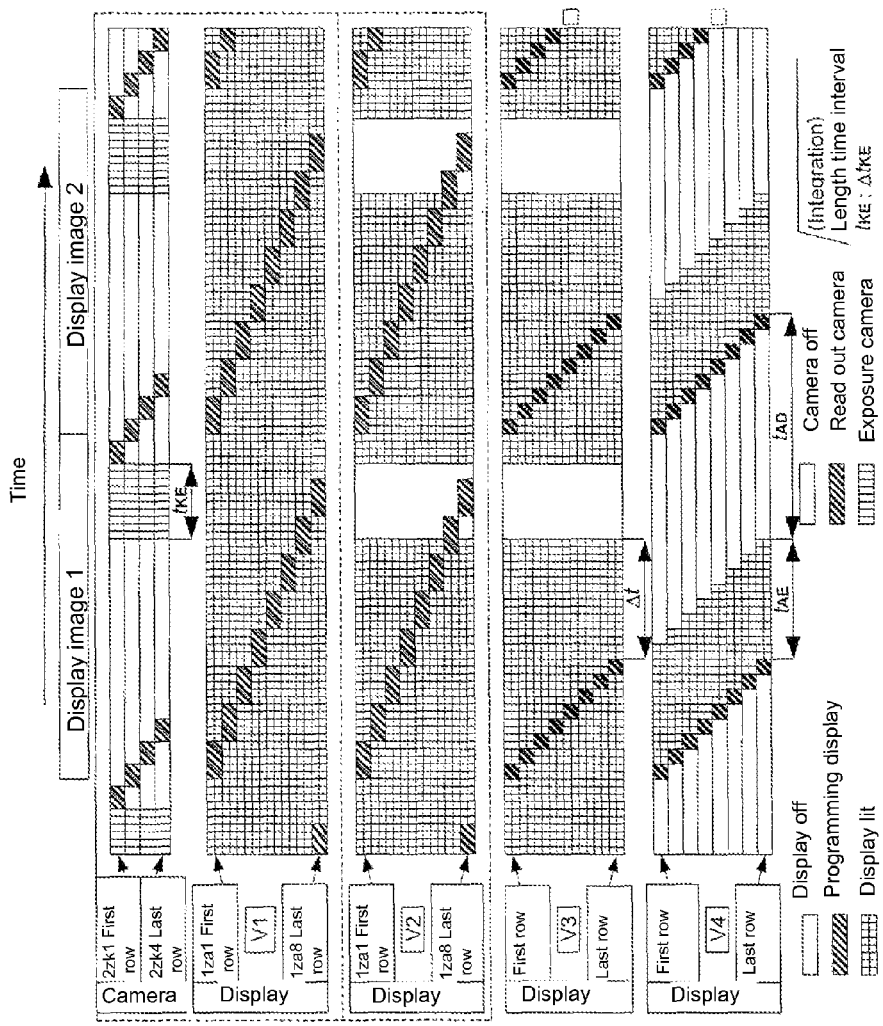
Figure 4:
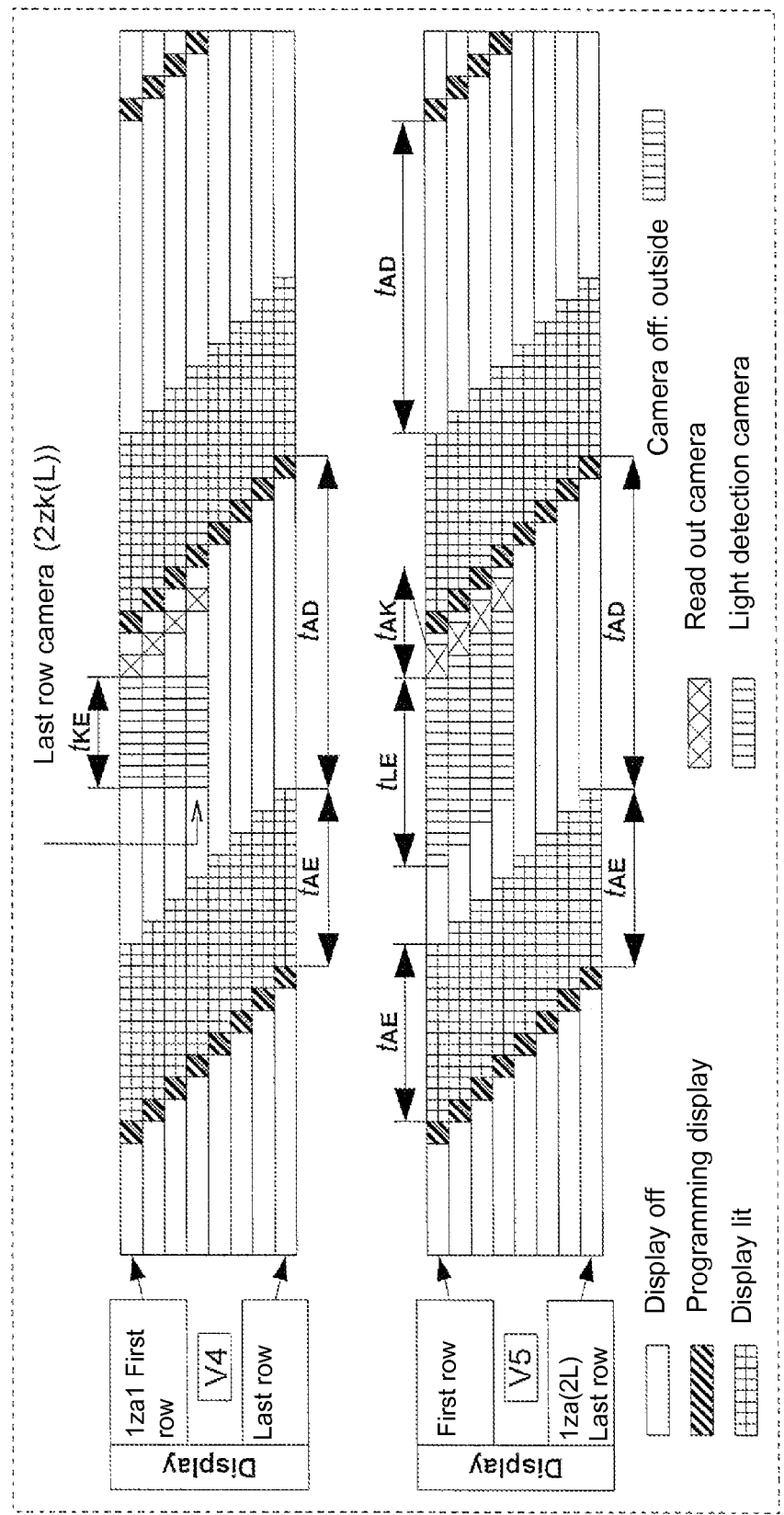
Figure 5:
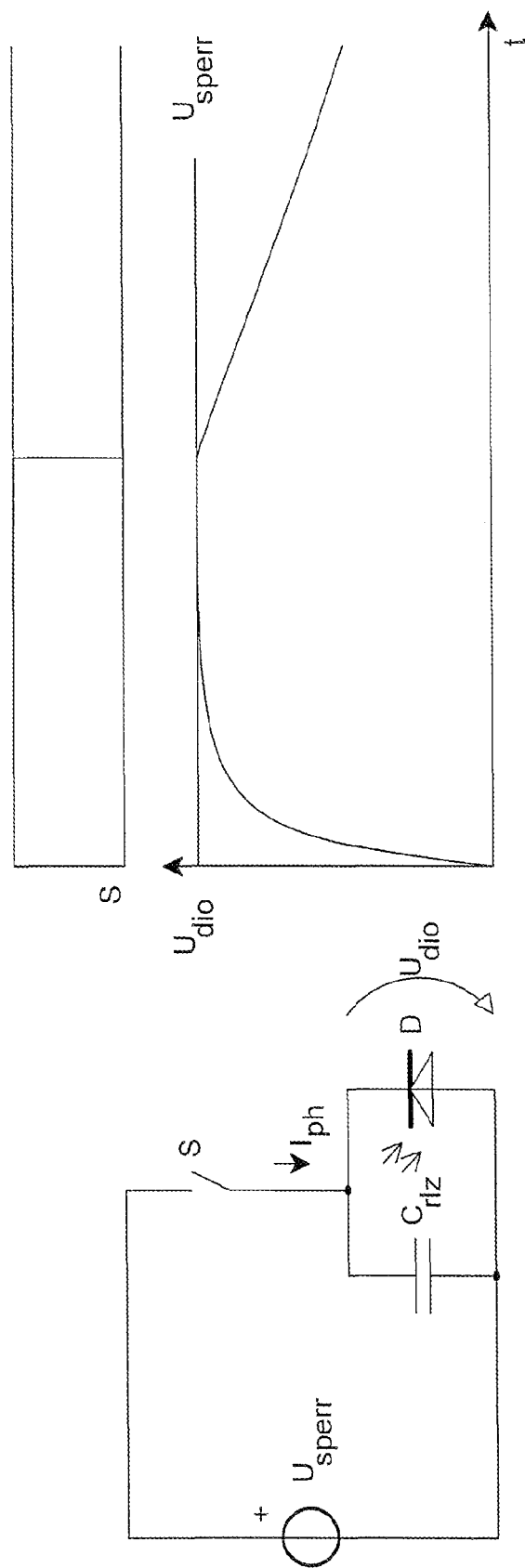
Figure 6:
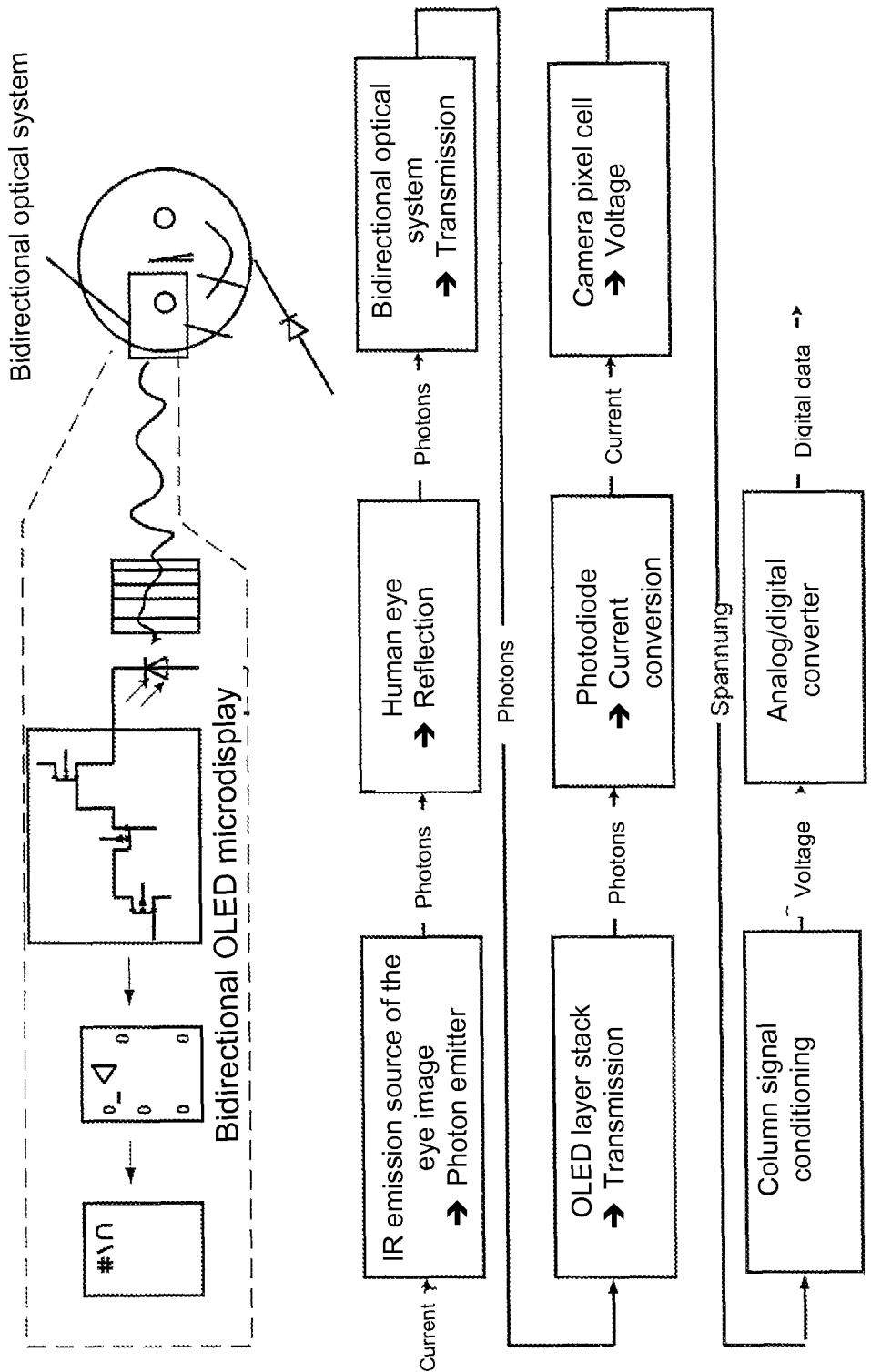

FIG. 1 an outline of the structure of a display in accordance with the invention with a two-dimensional display array and a two-dimensional camera array, with the arrays being mutually nested in the form of two gratings placed over one another;

FIG. 2 a complete separation, in a time aspect, of the electrical control of the display array and of the electrical control of the camera array as it can be realized in accordance with the invention in comparison with the parallel operation of the display (or display array) and the camera (array) known from the prior art;

FIG. 3 a plurality of electrical controls of the display array and of the camera array on a row base realized in accordance with the invention in comparison with the parallel operation of the prior art;

FIG. 4 a further electrical control of the display array and the camera array in accordance with the invention;

FIG. 5 a discharge circuit of a photodiode as it can be utilized as a light-detecting element within the framework of the invention; and FIG. 6 dependencies in the signal flow for the direction of the gaze detection such as can result in an HMD with a bidirectional display in accordance with the invention.

FIG. 1 outlines the active matrix of a bidirectional display in accordance with the invention with a two-dimensional display array 1 and a two-dimensional camera array 2, wherein the positions of the individual light-generating picture elements 1, 1b, . . . , of the display array corresponds to the points of intersection of a regular square grating and wherein the positions of the individual light-detecting elements 2a, 2b, . . . , of the camera array 2 likewise correspond to the positions of a further regular square, two-dimensional grating (the grating period p1 of the grating of the display array 1 in this respect corresponds to half the grating period p2 of the grating of the two-dimensional camera array 2). The two gratings of the display array 1 and of the camera array 2 are in this respect placed over one another offset from one another so that each of the light-detecting elements 2a, 2b, . . . , of the camera array 2 is surrounded by four respective individual light-generating picture elements 1a, 1b, . . . , of the display array 1 in the form of a regular four-adjacency.

The first row 1za1 of the bidirectional display which is thus created thus corresponds to the first row of the display array 1; the second row 2zk1 of the bidirectional display to the first row of the camera array 2. The third row 1za2 of the bidirectional display corresponds to the second row of the display array 1. The fourth row 1za3 of the bidirectional display corresponds to the third row of the display array 1. The fifth row of the bidirectional display (row 2zk2) corresponds to the second row of the camera array 2, etc.

The bidirectional display here thus includes a display array 2 having a total of 2L=10 rows which each comprise 10 picture elements 1a,2 1b, . . . , and a camera array 2 having a total of L=5 rows which each comprise five light-detecting elements 2a, 2b, . . . . The display array 1 and the camera array 2 are each electrically controllable row-wise (independently of one another) so that e.g. data can be written row-wise into the individual rows of the display array 1, can be displayed with the individual rows and can subsequently be deleted from the individual rows again. The reading out of the electrical signals generated by the light-detecting elements 2a, 2b, . . . , can equally take place row-wise. The electrical circuit for such a row-wise control of the display array 1 and of the camera array 2 is generally familiar to the skilled person.

The row of the camera array 1 next closest or arranged closest to the first row 1za1 of the display array 1 is thus the row 2zk1. This row 2zk1 is also the next closest row of the camera array 2 to the second row 1za2 of the array 1. The row of the camera array 2 next closest to the third row 1za3 of the display array 1 is thus the second row 2zk2 of the camera array 2.

In the simplest variant of the electrical control in accordance with the invention the light detection by the next closest row 2zk1 is thus deactivated (that is the camera detection is switched off in this row) during the light generation in the first row 1za1 (and the second row 1za2) of the display array 1. This can be carried out correspondingly pair-wise with the other rows 1za3, 1za4, . . . , of the display array 1. All the rows 2zk of the camera array 2 can naturally also be deactivated, for example, while a light generation takes place in another row 1za of the display array 1. Further details of the electrical controls of the two arrays 1, 2 in accordance with the invention will be described in the following.

FIG. 2 shows a first electrical control of the display array 1 and of the camera array 2 of FIG. 1 in accordance with the invention (lower half of the drawing: S)) in which, from a time aspect, a complete separation takes place of the electrical control of the display array 1 or of the electrical activity of this array, on the one hand, and of the electrical control of the camera array 2 or of the electrical activity of the latter array, on the other hand, in comparison with a parallel operation P) of the display array ("display") and of the camera array ("camera") known from the prior art.

FIG. 2 shows a cycle of the picture representation of the time duration $\Delta t_1 + \Delta t_2$ (that is the generation of a display image, within the framework of the invention also called light generation in the individual rows). During this cycle, the detection of the infrared light incident onto the light-detecting elements 2a, 2b, . . . , likewise takes place by the camera array, which is infrared-sensitive here (also called light detection by the individual rows of the camera array within the framework of the invention).

In the next cycle (not shown here), the representation of an optionally changed display image (cf. here e.g. "display image 2" in FIG. 3) then takes place.

The operation P) describes a parallel control method in which the display array 1 is programmed row-wise within the active matrix of the bidirectional display and in which the integration takes place in the camera array 2 and also the reading out of the camera data in the individual rows of the camera array 2 during the writing and representation of the data in the individual rows of the display array 1 ("write display data"). The temporal reference value of all processes described in P) is the dot clock. A new picture element is programmed into the display array e.g. with each dot clock. The interval of the camera start delay shown in P) serves as a dynamic time buffer to adapt the camera integration time within a cycle time. In operation, the camera integration has to be adapted in dependence on the amount of light incident onto the light-detecting elements to realize a high dynamic range.

In contrast, the electrical activity S) in accordance with the invention in the display array 1 ("display"), into which the total light generation in the individual rows of the display array 1 is incident, in the lower part of the Figure and the electrical activity of the camera array 2, during which the light detection by the individual rows of the camera array 2 takes place, are completely separate from one another. In a first time period $\Delta t_1$ (here corresponding to around the first 60% of the cycle time), only an electrical activity takes place in the display array 1, whereas in the subsequent second period $\Delta t_2$ of the cycle (here corresponding to around the last 40"% of the time duration of the cycle), only an electrical activity in the camera array 2 takes place, but not in the display array 1. In other words: Only a control of the display array 1 takes place in $\Delta t_1$, whereas in $\Delta t2$ only a control of the camera array 2 takes place.

The writing of the data into the display array, the representation of these data and the deletion of these data in the individual rows in this respect corresponds to the light generation in the display array in this example. The delay in the camera start, the signal accumulation ("camera integration") and the reading out of the camera data in the individual rows of the camera array 2 here corresponds to the light detection by the rows of the camera array 2. The OLED display array 1 shown in FIG. 1 is thus switched completely dark during the camera start, the camera integration and the reading out of the camera data.

FIG. 3 shows a total of three electrical controls in accordance with the invention of the display array 1 and of the camera array 2 of FIG. 1 (these controls or timings in accordance with the present invention are provided with the symbols V2, V3 and V4). The ordinate in FIG. 3 thus shows different electrical controls of the display array 1 or of the camera array 2 and the abscissa shows the time development of the light generation in the individual rows of the display array 1 and of the light detection in the individual rows of the camera array 2. (The control thus takes place row-wise both in the display array 1, of which here only eight individual rows 1za1 to 1za8 are shown for a simplified representation, and in the camera array 2, of which here only a total of four individual rows 2zk1 to 2zk4 are shown for a simplified representation.) "Display image 1" in this respect shows a first cycle (cf. FIG. 2); "display image 2" shows an identical second cycle following it.

The topmost section ("camera") of the ordinate thus shows the row-wise control of the individual rows 2zk of the camera array 2 from the first row to the last row. A simultaneous light detection by the shown rows 2zk1 to 2zk4 of the camera array 2 (in the case shown, the light detection in the camera rows corresponds to a time interval $t_{KE}$ during which—including an optionally present switch-on delay—an integration of the incident light quants in the individual rows of camera 2 takes place) thus only takes place during the time interval $t_{KE}$ (whose length $\Delta t_{KE}$ amounts to 5 msec here, for example) which is the same for all rows. The reading out of the individual camera rows takes place with a time offset in each case subsequent to the time interval $t_{KE}$.

The section of the ordinate second from the top ("display V1") shows the associated time development of the light generation in the individual rows 1za of the display array 1 in the case of the parallel operation of display and camera known from the prior art (cf. also P) in FIG. 2). In this known electrical control V1 of the display array 1 and of the camera array 2, an electrical activity thus also takes place in the display array in the form (depending on the row of the display array) of the writing of display data into a row of the display array ("programming display") or in the form of the representation or of the deletion of the corresponding display data (here combined under "display lit") during the light detection by the individual roes of the camera in the interval $t_{KE}$. The electrical activities in the display array 1, on the one hand, and in the camera array 2, on the other hand, are thus not separated in the parallel operation in the prior art.

The middle ordinate section ("display V2") shows, in conjunction with the upper ordinate section ("camera") a method in accordance with the invention, in the following also called a timing V2, for the electrical control of the display array 1 and of the camera array 2 of FIG. 1. If the light generation in a row 1za of the display array is defined as that time period during which one or more light-generating picture elements of this row represent data (that is are lit, "display lit"), it can be seen that during this light generation thus defined no light detection takes place in one of the rows of the camera array 2 ("camera off") in the individual rows of the display in each case in the electrical control or in the timing V2.

Only when the light generation in the rows of the display array is ended ("display off") does an electrical activity take place in the timing V2 in the camera array 2 in the form of the light detection during the interval $t_{KE}$ (with this light detection here taking place simultaneously for all rows of the camera array and including the switch-on delay to the start of the camera integration and the integration in the camera rows).

During the light detection by the camera 2 (in the interval $t_{KE}$), there is now no light generation in the display array 1, but rather only a programming of the last two rows of the display array 1 (the reading out of the camera not covered by the light detection in the camera 2 in the interval $t_{KE}$ by definition and carried out row-wise after one another also takes place in the following cycle here) during the light generation in the display array 1. The programming of a display row here includes the writing of data into this display row and the preceding deletion of the old data.

In the present case, no complete separation thus takes place here of the electrical control of the display array 1, on the one hand, and of that of the camera array 2, on the other hand, since the programming of the last two rows of the display still takes place during the exposure of the camera and the triggering of the camera takes place while the display is lit.

It is shown that this timing V2 admittedly already results in an improved optical decoupling of the display array 1, on the one hand, and of the camera array 2, on the other hand. However, in accordance with the invention, the electrical decoupling of the two arrays can be even improved in that, during the light detection (here including the switch-on delay and the integration) with the camera ("exposure camera"), no electrical activity takes place in the display array 1. This variant is shown in the timing V3: The latter is generally realized like the timing V2; but the programming of the display rows takes place such that a predefined break of at least the time duration Δt results (with here Δt amounting e.g. to 5 msec) for each row of the display array between the end of the programming of the this row and the start of the light detection by the camera array 2 (start of the time interval $t_{KE}$). All the electrical activity of the display array 1 thus takes place outside the time interval $t_{KE}$.

On the electrical control V3 of the display array 1 and of the camera array 2, a reduction in the luminosity of the display results over time as the time duration of the being lit increases in the OLED-based display array 1 shown in FIG. 1, starting from the moment of the ending of the row programming in the display (that is from the start of the time period marked by "display lit" in FIG. 3). This is due to the fact that the illuminated panel is operated in a pulsed manner and a brightness thus results on average for the viewer which is reduced by the pulse ratio.

The interruption of the light generation in the individual rows of the display area takes place in the timing V3 (during the time interval $t_{KE}$ in which an exposure of the camera takes place); at different points in time after the end of the row programming ("programming display") for the individual rows 1za of the display array 1. It is thus admittedly ensured that the individual display rows 1za in a cycle are light-generating or are lit over one and the same time duration overall in a cycle (time duration from the end of the programming of the row in one cycle, e.g. "display image 1" in FIG. 3, up to the start of the next row programming in the same row in the next cycle, cf. "display image 2" in FIG. 3, less the length $\Delta t_{KE}$ of the interval $t_{KE}$). On the other hand, due to the high display image rate or frame rate of e.g. 400 Hz, the observer of the display array ultimately perceives the integral over the luminosity of the individual rows of the display array 1 output in the prescribed time period per cycle. If now the interruption of the light generation in the individual rows takes place (starting from the end of the row programming) at different points in time, different values result for the image brightness values perceived by the user of the rows in accordance with the already described integral due to the already described reduction of the luminosity in the course of time over the cycle. In other words, those rows of the display array in which the interruption of the light generation takes place during the time interval $t_{KE}$ at an earlier point in time after the end of the row programming appear darker for the observer than those rows in which the interruption of the light generation during the interval $t_{KE}$ takes place at a later point in time after the end of the row programming. This is, however, not desired.

The already described problem is solved as follows in the electrical control V4 or in the corresponding timing: The light detection admittedly takes place as in the timing V3 in all rows 2zk of the camera array during one and the same time interval $t_{KE}$. In addition, the light generation in different rows 1za of the display array takes place offset in time in each case (respectively starting at the end of the programming of the corresponding row, with then the light generation for each of the rows 1za taking place outside the time interval $t_{KE}$, that is outside the light detection in the rows 2zk of the camera array 2) and the time duration of the light generation $t_{AE}$ ("display lit" including the representation of the display data in the respective row starting with the end of the programming of the corresponding display row) is of equal length for each row 1za of the display array. In other words, the time duration $t_{AE}$ of the light generation is identical for all rows 1za. The time duration $t_{AD}$ in which the light generation of the individual display rows 1za is deactivated (that is the duration from the end of the light generation in one row in one cycle up to the start of the light generation in this row in the next cycle) is also identical for all rows of the display array 1. It is thus ensured that the time interval $t_{KE}$ of the camera exposure falls in a time interval for each row 1za of the display array 1 in which the corresponding row of the display array 1 is switched off and the relationship of the time duration of the switching off of the display row and of the light generation by the display row is the same. The already described problem of the timing V3 thus does not occur in the electrical control of the arrays 1, 2 in accordance with the timing V4.

A further inventive electrical control of the display array 1 and of the camera array 2 of FIG. 1, also called the timing V5 in the following, is shown in comparison with the already described timing V4 in FIG. 4 (in this representation, the time elapse of the electrical control of the camera array 2 is shown superimposed on the time elapse of the electrical control of the display array 1; only four rows 2zk of the camera array 2 and eight rows 1za of the display array 1 are also shown here).

Whereas in the already described timing V4, the light detection takes place at the same time (in the same time interval $t_K$) for all rows 2zk of the camera (only the point in time of the reading out of the individual camera rows 2zk is displaced accordingly, that is takes place with a time offset after the end of the interval $t_{KE}$), this is no longer the case in the timing V5 in accordance with the invention: Not only the light generation in the individual rows 1za of the display array 1 takes place with a mutual time offset during the time interval $t_{AE}$ in the timing V5, but the light detection also takes place in the individual rows 2zk with a mutual time offset during that time period $t_{AD}$ during which the corresponding row 1a of the display array 1 is respectively deactivated or switched off.

In other words, a cycle in the timing V5 for an individual display row 1za (e.g. row 1za1) and the camera row 2zk next closest to it (e.g. row 2zk1 as the next closest row to the display row 1za1) runs as follows: Programming of the display row 1za, light generation in the display row 1za (during the interval $t_{AE}$), end of the light generation in the display row 1za (the display row 1za then remains switched off over the time duration $t_{AD}$), start of the electrical activity in the corresponding camera row 2zk, that is of the light detection in this camera row (the light detection then takes place during the time duration $t_{LE}$), end of the light detection in the corresponding camera row 2zk, reading out of this camera row during the time interval $t_{AK}$ and finally, after the end of the camera read out $t_{AK}$, start of the next cycle or of the repeat programming of the corresponding display row 1za.

As FIG. 4 shows in the ordinate section "display V5", the electrical activity or the detection of light starts in this respect in the first camera row 2zk1 (after switching off the display row 1za1 next closest to this row) at a point in time at which the last row 1za(2L) of the display array 1 furthest remote from this first camera row 2zk1 is still switched to light generating. It must thus be ensured that the distance of the last row(s) of the display array 1 from the first row(s) 2zk2, 2zk2, . . . , of the camera array is so large that crosstalk of the light generated by this/these last row(s) of the display array 1 into the light-detecting elements 2 of the first row(s) of the camera array 2 is negligibly small.

The timing V5 in accordance with the present invention shown in FIG. 4 has the advantage over that in accordance with V4 that the possible length of the time interval $t_{LE}$ for the light detection by the time offset possible for each row in the camera array 2 is larger on the light detection than the time $\Delta t_{KE}$ available for the light detection in the individual rows in accordance with the time interval $t_{KE}$ in the timing V4 (in which the light detection takes place simultaneously in all rows of the camera) (optimizing of the maximum light detection time, that is of the maximum integration time of the camera rows).

In accordance with the invention, different row-based sequential controls of the display array and of the camera array are thus possible (for example, over the timings V2 to V5) in which (see e.g. the timing V4) the electrical control or the electrical activity in the display array 1, on the one hand, and in the camera array 2, on the other hand, can be almost completely or completely separated from one another.

In order in particular to be able to ideally utilize the bidirectional display in accordance with the invention and its electrical control in the field of the HMDs (in the form of bidirectional OLED microdisplays), a procedure for dimensioning the system components and their control is proposed in the following in accordance with the invention. In this respect, FIG. 6 shows the dependencies for the detection of the direction of gaze in an HMD in accordance with the invention which is based on a bidirectional OLED microdisplay in accordance with FIG. 1.

The human eye may only be irradiated by photons by an infrared radiation sources 3 up to a limit value fixed by law. This limit value is inter alia dependent on the arrangement of the IR emitter 3. The limit values are laid down in the standards DIN EN 62471 on the photobiological safety of lamps and lamp systems as well as DIN EN 60825-1 on the safety of laser products. Some of the photons are reflected at the eye and are transmitted through a bidirectional optical system. In the next signal member, some of the photons are again transmitted through an OLED layer stack and the photons are subsequently converted to the photocurrent $I_{ph}$ within the photodiodes 2, 2b, . . . , or within the camera array 2 respectively. The camera pixel cell circuit converts the photocurrent into a voltage force $U_{DIO}$ (cf. in this respect FIG. 5 (5=time). An analog/digital converter digitizes the voltage signal $U_{DIO}$ to make it usable for a software eye-tracking algorithm.

A robust eye image detection generally requires a high voltage spike in the pixel cell or in the light-detecting element 2a, 2b, . . . , of the camera array 2. Within the system shown in FIG. 5, this voltage spike $U_{DIO}$ can be calculated according to the following equation 1:

$$U_{dio} = U_{sperr} - \frac{I_{ph} + I_s}{C_{rlz}} T_{int}$$

($U_{ido}$=voltage at the photodiode; $U_{sperr}$=operating voltage of the camera pixel cell, $I_{ph}$=photocurrent, Is=cutoff current of the photodiode, $C_{RLZ}$=volume charge capacity of the photodiode).

The level of the photocurrent $I_{ph}$ is indirectly dependent on the maximum radiation power $H_{ir\_max}$ prescribed by law at the human eye and on the reflection and transmission loss within the system shown in FIG. 6. The photocurrent $I_{ph}$ is directly dependent on the spectral sensitivity of the integrated light detecting elements 2a, 2b, . . . .

After determining the photocurrent $I_{ph\_rain}$ to be expected as a minimum in the system (see also in the following), the maximum settable or possible integration time $T_{int}$ can be determined ($T_{int}$ then substantially, i.e. except for any camera start delay times in the individual rows, corresponds to the time interval $t_{KE}$ in the timing T4 or to the time interval $t_{LE}$ in the timing V5). Too high a maximum integration time $T_{int}$ defined in the system requires a higher spot clock frequency and an increased power consumption associated therewith.

To coordinate the whole system with respect to the robustness of the eye image detection and with respect to an optimized power consumption, the following procedure is possible to determine the maximum settable integration time (or the maximum time for the light detection by a row $2zk$ of the camera array during a frame or a display image):

Calculation of the transmission properties of the OLED layer stack or of the active matrix of display array and camera array in dependence on the wavelength λ of the incident light, e.g. by utilizing the transfer-matrix method familiar to the skilled person. (With respect to this method: see Sernelius, Bo E.: Reflection from a metallic surface. Lecture, University of Linköping, 2010).

Simulation or measurement of the spectral sensitivity dependent on the wavelength λ of the light-detecting elements or photodiodes or phototransistors integrated in the bidirectional OLED microdisplay in accordance with the present invention.

Determining a maximum achievable spectral sensitivity by addition of the transmission curve of the active matrix or of the OLED layer stack and of the curve of the spectral sensitivity of the light-detecting elements.

Selecting the maximum wavelength λ of the IR emitter 3 in the value range 800 nm<λ<1,000 nm to be able to achieve a high spectral sensitivity in the OLED layer stack or in the active matrix and within the light-detecting elements or the photodiodes.

Calculating the maximum permitted radiation power of the eye in accordance with DIN EN 62471 and DIN EN 60825-1.

Calculating the optical transmission properties of the camera array in the bidirectional display.

Estimating the minimum achievable reflection at the human eye.

Based on the preceding calculations or estimates, the minimum achievable photocurrent $I_{ph\_min}$ can be estimated within the camera pixel cell or within a light-detecting element $2a$, $2b$, . . . . With reference to this value $I_{ph\_min}$, accordance with the above equation 1, the maximum settable integration time $T_{int}$ (or the time $t_{KE}$ or $t_{AD}$ in the timing V4 or V5) for $U_{DIO} \approx U_{SPERR}$ within the camera pixel cell has to be determined by calculation (alternatively to this, $T_{int}$ can also be determined by analog simulation.

The determined integration time $T_{int}$ then serves as the basis for the dimensioning of the ideal control of the bidirectional OLED microdisplay, that is for the selection of the time interval in the controls of the two array 1, 2 in accordance with the invention shown in FIGS. 3 and 4.

While the display array 1 in the parallel operation P) known from the prior art (cf. top of FIG. 2) continuously shows data and the camera array 2 nested therein simultaneously detects the direction of gaze of the user, the optical and/or electrical crosstalk between the light-generating picture elements $1a$, $1b$, . . . , and the light-detecting elements $2a$, $2b$, is minimized or even fully prevented by the bidirectional displays controlled in accordance with the invention. This has the advantage that the camera image of the camera array 2 taken can also nevertheless be used for a determination of the direction of the gaze of the eyes at high display luminance densities. The separation in accordance with the invention of the lit time of the display array and of the taking of camera image by the camera array is essential for this.

As already described, FIG. 2 shows the comparison of the parallel control process known from the prior art and the sequential control method in accordance with the present invention. The display can be written in first in the sequential method in accordance with the invention. The OLED is lit during this phase. To represent the same brightness in time for each image row, the rows are deleted in the same order as on the writing. Subsequently, the OLED can be switched to dark and only then does the integration interval $T_{int}$ begin with the camera array 2. The camera array 2 is subsequently read out. The required dot clock frequency $f_{pixel}$ can be calculated as follows for the sequential control method in accordance with the invention in accordance with the following equation (equation 2) while including the previously calculated maximum integration time $T_{int}$ as well as the display and camera definition.

$$f_{pixel} = \frac{N_{ein\_d} + N_{dar\_d} + N_{l\ddot{o}sch\_d} + N_{aus\_k}}{T_{zyk\_s} + T_{int}}$$

$N_{ein\_d} \approx N_{l\ddot{o}sh\_d} \approx$ Number_display_rows·Number_display_columns $N_{dar\_d}$=Number_of_dot clocks_during_the_lit_phase, $N_{aus\_k} \approx$ Number_camera_rows·Number_camera_rows
and $$T_{zyk\_s} = \frac{1}{\text{Image repeat frequency}} = \frac{1}{f_{bild}}$$

In the timing V2 in accordance with the invention, the OLED is switched to completely dark for the length of the camera exposure during the display programming. In the timing V2, the display array 1 is thus switched off for a specific time window while the display controller is still writing data. The timing V3 in accordance with the invention describes the fast programming of the display matrix and the switching off of the display during the exposure time and after the display programming phase. In the timing V3, the display array 1 is switched off for a specific time window after the display controller has written all data.

The timing V4 in accordance with the invention describes a purely sequential operation (cf. FIG. 2 S)) in which the display matrix is programmed row-wise and is also deleted row-wise after a specific lit time. The camera exposure takes place after the deletion of the last display row. The timing V4 in accordance with the invention can also be used for dimming the display (regulating the brightness over the pulse width or, more precisely, over the time interval $t_{AD}$ during which the corresponding display row is switched off, cf. FIG. 4). The total brightness of the bidirectional display in accordance with the invention can thus be controlled by a variation of the lit time for each display row. In the timing V4, the individual display array rows are thus switched off in a stepped manner; a complete switching off of the display array then takes place. If the brightness settable in the system is varied, it applies that with a higher brightness the lit time is larger for each display array row or image row.

Bidirectional displays in accordance with the invention can be OLED microdisplays with a nested active matrix. However, they can equally be separate display arrays and camera arrays on a CMOS circuit. The maximum possible photocurrent $I_{ph}$ can be generated within the camera pixel cells in the bidirectional OLED microdisplay by the procedure likewise proposed in accordance with the invention for the design of the IR emission source. The minimum required integration time $T_{int}$ can be determined by equation 1 by definition of this photocurrent. With an integration time which is not ideal and which is selected as too large, the effort in the circuit design increases, the system frequency and the power consumption increases and the reliability of the system drops due to the high frequency.

Utilizing the ideally determined integration time $T_{int}$, the sequential electrical controls in accordance with the invention can be used to avoid interference by optical and/or electrical crosstalk between the OLED pixels and the camera pixels. As a result, an HMD system realized on the basis of the display in accordance with the invention can be operated at an optimized power consumption and an interference-free image taking. Furthermore, a brightness control is also possible by the sequential electrical control in accordance with the invention.

Highly-miniaturized eye-tracking HMDs can thus be operated in a robust manner. The display brightness can also be set variably without any further external circuit components such as cathode voltage regulators.

The invention claimed is:

1. A bidirectional display, comprising:
   a two-dimensional display array comprising a plurality of light-generating picture elements;
   a two-dimensional camera array comprising a plurality of light-detecting elements; and
   a time-sequential electrical control of the display array and of the camera array;
   wherein the display and camera arrays are each electrically controllable row-wise and are arranged nested in one another at least section-wise;
   wherein the electrical control of the display array and of the camera array is configured such that;
      during a light generation in a row of the display array, a light detection by a row of the camera array next closest thereto is deactivated, and a row-sequential electrical control of the bidirectional display is provided;
      during the light generation in a plurality of adjacent rows of the display array, the light detection by rows of the camera array next closest to this plurality of adjacent rows is deactivated; and
      a light detection is enabled during a light generation in a row of the display array by a row of the camera array that is not the row of the camera array next closest thereto.

2. The bidirectional display in accordance with claim 1, wherein the electrical control of the display array and of the camera array is configured such that during exposure of at least a part of the camera array by an external light, and/or during light detection by one row, a plurality of rows, or all rows of the camera array, a light generation and/or an electrical activity is not enabled in any of the rows of the display array.

3. The bidirectional display in accordance with claim 1, wherein the electrical control of the display array and of the camera array is configured such that during a light generation in any of the rows of the display array, any and all light detection by the camera array is deactivated by a complete time separation of electrical control of the display array and electrical control of the camera array.

4. The bidirectional display in accordance with claim 1, wherein a specified time interval $\Delta t$ having a duration of at least $\frac{1}{10}$ the time duration $\Delta t_{KE}$ of light detection by the rows of the camera array lies for at least one row of the display array between an end of a programming and/or writing of data to this at least one row of the display array, on the one hand, and a start of the light detection by one row, a plurality of rows, or all rows of the camera array, on the other hand.

5. The bidirectional display in accordance with claim 1, wherein light generation in a row of the display array includes one of:
   (a) a writing of data to be represented in this row of the display array into this row of the display array and/or programming of this row of the display array, a representation of data in this row of the display array and a deletion of represented data from this row of the display array;
   (b) only the writing and/or programming described above in (a), on the one hand, and the representation described above in (a), on the other hand;
   (c) only the representation described above in (a) and the deletion described above in (a); or
   (d) only the representation described above in (a).

6. The bidirectional display in accordance with claim 1, wherein light detection in a row of the camera array includes one of:
   (a) a switch-on delay up to a start of an integration of light quants emanating from an external light source and incident onto the row of the camera array and a reading out of a corresponding row signal integrated in this manner;
   (b) only the switch-on delay described in (a) and the integration described in (a);
   (c) only the integration described in (a) and the reading out described in (a); or
   (d) only the integration described in (a).

7. The bidirectional display in accordance with claim 1, configured to provide a plurality of mutually following light generations by individual rows of the display array corresponding to a plurality of display images or frames to be represented, with a light detection by the camera array in accordance with claim 1 configured to occur for each of these light generations.

8. The bidirectional display in accordance with claim 1, comprising a display array configured for emitting light visible to the human eye; and/or a camera array configured for detecting infrared light.

9. The bidirectional display in accordance with claim 1,
   wherein the display array includes organic light emitting diodes (OLEDs) as light-generating picture elements;
   wherein the camera array includes at least one of photodiodes or phototransistors as light-detecting elements;
   wherein the light generating picture elements and/or the light-detecting elements are configured either as separate matrices or as mutually nested matrices or as matrices formed and/or integrated in complementary metal-oxide-semiconductor (CMOS) technology; and/or
   wherein the bidirectional display includes a microdisplay having a side length of the light-generating picture elements in a range between 4 μm and 40 μm and/or having a side length of the light-detecting elements in a range between 4 μm and 40 μm.

10. The bidirectional display in accordance with claim 1, wherein the electrical control of the display array and of the camera array is configured such that a light detection is enabled during a light generation in a row of the display array by a row of the camera array that is furthest therefrom.

11. The bidirectional display in accordance with claim 1, configured such that both light detection in the individual rows of the camera array and light generation in the individual rows of the display array occur mutually offset in time, with the light detection for all rows of the display array occurring in a respective next closest row of the camera array outside the time interval of the light generation.

12. A bidirectional display, comprising:
a two-dimensional display array comprising a plurality of light-generating picture elements;
a two-dimensional camera array comprising a plurality of light-detecting elements; and
a time-sequential electrical control of the display array and of the camera array;
wherein the display and camera arrays are each electrically controllable row-wise and are arranged nested in one another at least section-wise;
wherein the electrical control of the display array and of the camera array is configured such that;
during a light generation in a row of the display array, a light detection by a row of the camera array next closest thereto is deactivated, and a row-sequential electrical control of the bidirectional display is provided;
during the light generation in a plurality of adjacent rows of the display array, the light detection by rows of the camera array next closest to this plurality of adjacent rows is deactivated; and
during a light detection by one row, a plurality of rows, or all rows of the camera array in a first one or more rows of the display array, a programming of the first one or more rows of the display array and/or a writing of data to be presented in the first one or more rows of the display array is enabled in the first one or more rows of the display array, but not a representation of data in the first one or more rows of the display array.

13. A bidirectional display, comprising:
a two-dimensional display array comprising a plurality of light-generating picture elements;
a two-dimensional camera array comprising a plurality of light-detecting elements; and
a time-sequential electrical control of the display array and of the camera array;
wherein the display and camera arrays are each electrically controllable row-wise and are arranged nested in one another at least section-wise;
wherein the electrical control of the display array and of the camera array is configured such that:
during a light generation in a row of the display array, a light detection by a row of the camera array next closest thereto is deactivated, and a row-sequential electrical control of the bidirectional display is provided; and
during the light generation in a plurality of adjacent rows of the display array, the light detection by rows of the camera array next closest to this plurality of adjacent rows is deactivated;
wherein a time duration $t_{AE}$ of light generation is of equal length for all rows of the display array;
and/or
wherein, for all rows of the display array, a time duration $t_{AD}$ of deactivation of the light generation and/or of electrical deactivation and/or of the switching off of a particular row of the display array is of equal length.

14. A bidirectional display, comprising:
a two-dimensional display array comprising a plurality of light-generating picture elements;
a two-dimensional camera array comprising a plurality of light-detecting elements; and
a time-sequential electrical control of the display array and of the camera array;
wherein the display and camera arrays are each electrically controllable row-wise and are arranged nested in one another at least section-wise;
wherein the electrical control of the display array and of the camera array is configured such that:
during a light generation in a row of the display array, a light detection by a row of the camera array next closest thereto is deactivated, and a row-sequential electrical control of the bidirectional display is provided;
during the light generation in a plurality of adjacent rows of the display array, the light detection by rows of the camera array next closest to this plurality of adjacent rows is deactivated; and
light detection in all rows of the camera array occurs during one and the same time interval $t_{KE}$; and light generation occurs in individual rows of the display array with a time offset from one another and outside the time interval $t_{KE}$ for all rows of the display array.

15. A method for electrically controlling a bidirectional display, the method comprising:
electrically controlling a two-dimensional display array of the bidirectional display in a time-sequential, row-by-row manner, the display array including a plurality of light-generating elements;
electrically controlling a two-dimensional camera array of the bidirectional display in a time-sequential, row-by-row manner, the camera array including a plurality of light-detecting elements nested among the plurality of light-generating elements;
wherein when a first row of the display array is activated for generating light:
a row of the camera array adjacent to the first row is deactivated from detecting light; and
a row of the camera array non-adjacent to the first row is activated for detecting light.

16. The method of claim 15, further comprising using the bidirectional display for eye-tracking.

17. The method of claim 15, further comprising using the bidirectional display to provide eye-control for an apparatus.

* * * * *